Figure 1:
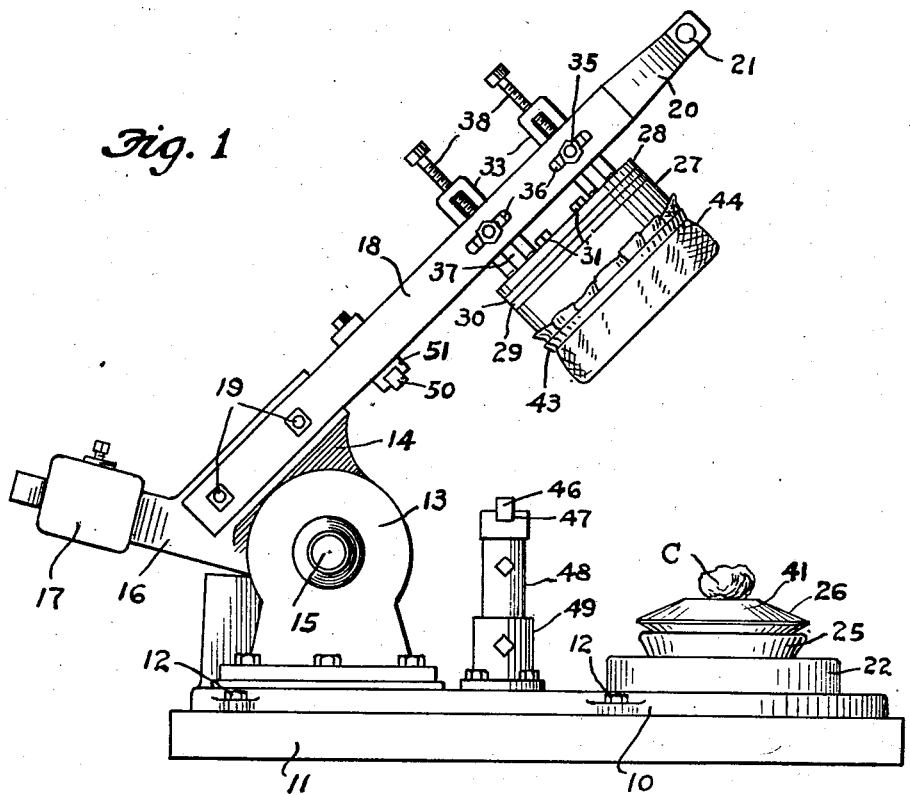

Jan. 2, 1945.    J. TURNER    2,366,297
CLAY WORKING MACHINE
Filed Oct. 29, 1943    2 Sheets-Sheet 1

Inventor
James Turner
By Frease and Bishop
Attorneys

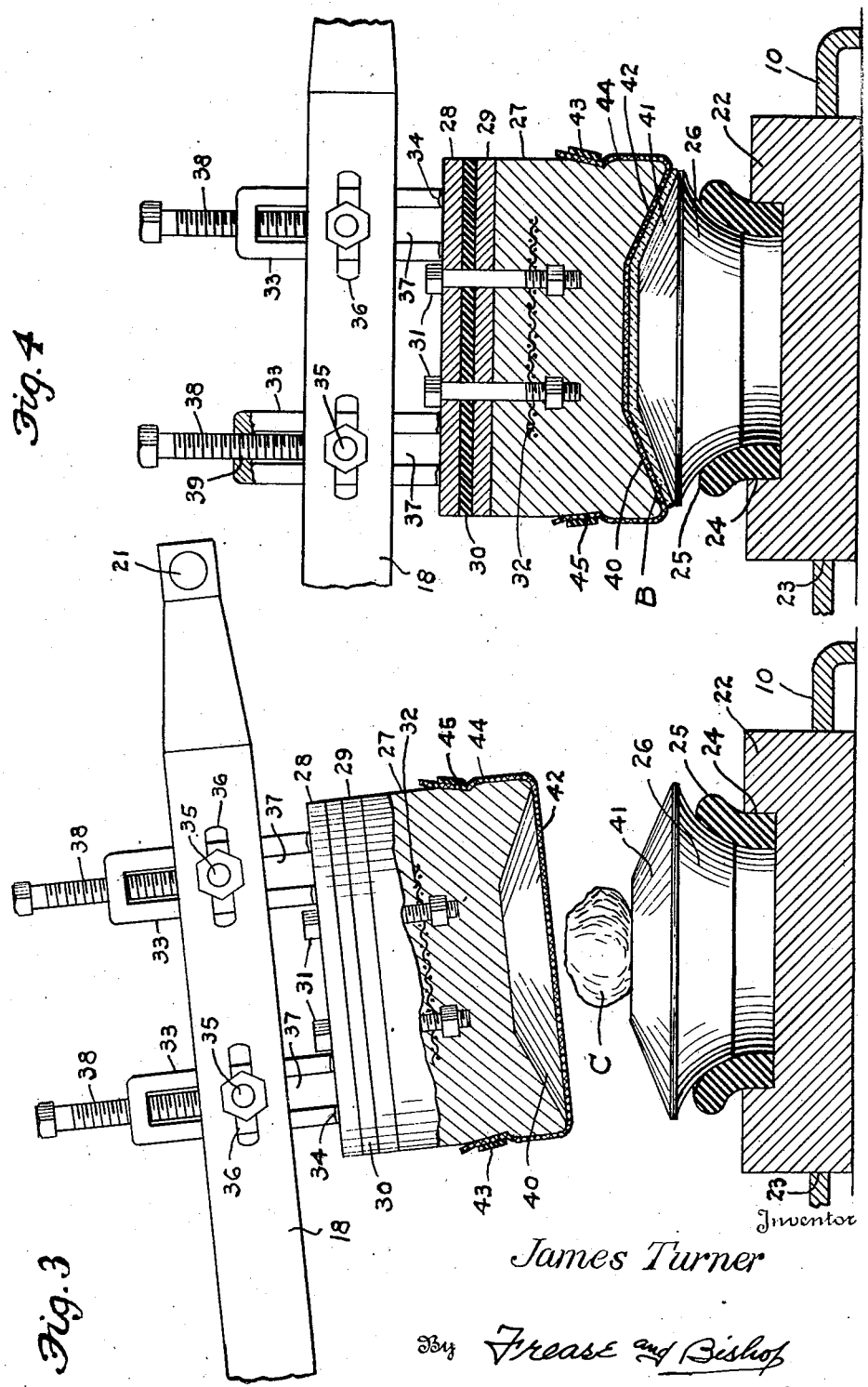

Patented Jan. 2, 1945

2,366,297

UNITED STATES PATENT OFFICE 2,366,297

CLAY WORKING MACHINE

James Turner, Sebring, Ohio, assignor of one-half to Limoges China Company, Sebring, Ohio, a corporation of Ohio, and one-half to Frank M. Kinnard, Sebring, Ohio Application October 29, 1943, Serial No. 508,106

8 Claims. (Cl. 25—27)

The invention relates to pottery machinery, and more especially to the type of machines known generally in the industry as batters, for batting out lumps, or balls of clay into what is known in the potteries as a bat, preparatory to jiggering the same upon a mold to shape a plate, dish or similar article, and the present invention concerns certain improvements upon the batter disclosed in United States Letters Patent No. 2,167,386, issued to Frank M. Kinnard on July 25, 1939.

Under present practice, as indicated in said Kinnard patent, a perfectly flat clay bat is formed in the batter machine and then transferred to a mold which is placed in a jigger and shaped with a profile tool, after which the mold, with the shaped article thereon is removed from the jigger and placed in a drier, and another mold is placed in the jigger and the process is continued, the forming of each article requiring four separate steps comprising first forming the clay bat on the batter machine, then placing a mold in the jigger, then transferring the flat clay bat from the batter to the mold, and finally shaping the article in the jigger.

The present invention contemplates certain improvements in the batter which will result in shortening the process, so as to speed up the production of dinnerware and similar articles thus decreasing the cost of manufacture.

In carrying out the invention this saving is accomplished by so constructing the batter machine that instead of forming a perfectly flat clay bat and then transferring it to a mold, which has been placed in the jigger, the bat is formed directly upon a mold and then the mold with the formed bat thereon is transferred to the jigger and the article is shaped by the profile tool, as in usual practice.

It is therefore an object of the invention to provide a clay working machine of the batter type having means whereby a clay bat may be formed directly upon a mold positioned in the machine.

Another object is to provide such a machine in which the clay bat is shaped to conform to the mold.

Still another object is to provide such a machine in which the batter of the machine is shaped complemental to the mold so as to form the clay bat to approximately the shape desired in the finished article.

A further object of the invention is to provide a machine of this type having a concaved batter provided with a flexible diaphragm.

A still further object is the provision of a cushion mounting, in the batter machine, for the mold to prevent injury thereto when the clay bat is formed thereon.

The above objects, together with others which will be apparent from the drawings and following description, or which may be later referred to, may be attained by constructing the improved clay working machine in the manner illustrated in the accompanying drawings, in which—

Figure 2:
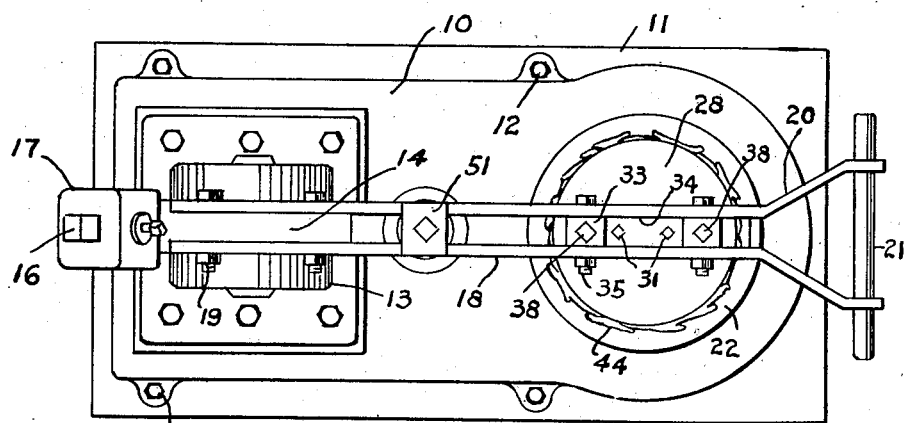

Figure 1 is a side elevation of a clay working machine embodying the invention, showing the batter in raised position and a mold positioned in the machine;

Fig. 2, a top plan view of the machine showing the batter in the lowered or operated position;

Fig. 3, a vertical sectional view, on a larger scale, showing a lump or ball of clay upon the mold and the batter just about to engage the same; and Fig. 4, a similar view showing the batter in fully lowered position with a clay bat formed upon the mold.

Similar numerals refer to similar parts throughout the drawings.

The machine is shown mounted upon a base 10 which may be attached to a table or other support 11 as by the bolts 12. A bearing bracket 13 is mounted upon one end portion of the base, and a journal bracket 14 is journalled thereto, as by the journal 15, and has fixed thereto the rearwardly extending arm 16, to which may be connected a counterweight 17, spring or equivalent means for normally holding the batter in raised position as will be later described.

The lever arm 18 may be formed of two similar parts, as shown in Fig. 2, bolted to opposite sides of the journal bracket 14, as by the bolts 19, the outer ends of the two lever halves being diverged, as at 20 and having a hand grip 21 fixed thereto for operation of the machine. The lever arm may be operated manually or by any suitable mechanical means if desired.

At the opposite end of the base 10 is located a block 22 of plaster or the like, which may be mounted in a recess 23 formed in the base for that purpose.

The block 22 has a socket 24 in its upper surface, in which is located a heavy ring 25, of resilient rubber or the like, forming a cushion seat for a plaster mold 26 such as is commonly used in jiggers for forming dishes, plates and similar articles.

The batter 27 may be formed of plaster or the like as in usual practice, and as shown in the drawings may have two spaced steel plates 28 and 29, with a cushion 30 of rubber or the like therebetween, connected to the top of the batter as by the bolts 31, a wire mesh 32 being embedded in the plaster batter 27 around the lower end portions of the bolts, as shown in Figs. 3 and 4.

A pair of slotted uprights 33 may be rigidly connected in any suitable manner, as by welding indicated at 34 to the upper plate 28 of the batter, these uprights extending upward through the slot 34 formed between the spaced bars of the lever arm 18, bolts 35 being located through the longitudinal slots 36 in the lever arm and through the upright slots 37 of the members 33 for adjusting the batter vertically and horizontally relative to the lever arm 18.

Adjusting screws 38 are threaded through the tapped openings 39 in the upper portions of the slotted upright members 33 and extend downwardly through the slots 37 therein to engage the adjusting bolts 35 to hold the same in adjusted position.

The underside of the batter 27 is concaved as shown at 40 conforming to the contour of the upper portion 41 of the mold 26, these shapes being of course changed for each plate, dish or other article to be made.

For the purpose of causing the batter to quickly and completely disengage from the molded bat, after the same has been formed, so that the bat will remain in proper form and adhere to the mold 41, a flexible, resilient diaphragm 42 which is preferably formed of flannel or similar material is stretched across the concavity 40 at the bottom of the batter and attached to the batter as by the ring or band 43 of elastic or the like which encircles the upturned edge portions 44 of the diaphragm material engaging the same in the peripheral groove 45 in the batter.

A block 46 of rubber or the like may be mounted in the socket 47 formed at the upper end of the post 48 which may be adjustably mounted in the sleeve 49 fixed upon the base 10, and is adapted to be engaged by a similar block 50 of rubber or the like mounted in an adjustable bracket 51 carried by the lever arm 18 and acts as a bumper for the lever when the same is manually swung down to operated position.

In operating the machine to form a bat of clay, a mold 26 is placed in the cushion 25 upon the block 22 of the machine as shown in Figs. 1 and 3 and a ball or lump of clay as indicated at C is placed upon the top of the mold as shown in said figures.

The lever arm 18 is then swung down to the position shown in Figs. 2 and 4 of the drawings batting the ball of clay into a formed bat as shown at B in Fig. 4 shaped to the general contour of the dish or other article to be made. The lever 18 is then released and the weight 17 or its equivalent swings the same back to the initial position shown in Figure 1, the diaphragm 42 springing back to normal position such as shown in Fig. 3, quickly and completely releasing the batter from the clay bat which remains in proper position adhering to the upper portion 41 of the mold.

It will be evident that as the diaphragm 42 is stretched into the recess 40 of the batter 27, air will be compressed in the recess behind the diaphragm, and as the lever arm swings upward, raising the batter, this compressed air will assist in quickly forcing the diaphragm back to the normal position, as shown in Fig. 1, causing the diaphragm to be quickly released from the clay bat.

The mold 26 with the formed clay bat thereon is then transferred directly to the jigger where the dish or other article may be jiggered by the profile tool as in usual and ordinary practice.

I claim:

1. A clay working machine including a block, a mold removably mounted on said block, an arm pivoted adjacent to said block, a batter carried by said arm and having a concaved lower surface conforming to the contour of said mold, and a flannel diaphragm located over the concaved surface of the batter.

2. A clay working machine including a block, a mold removably mounted on said block, a resilient cushion between the mold and the block, an arm pivoted adjacent to said block, a batter carried by said arm and having a concaved lower surface conforming to the contour of said mold, and a flannel diaphragm located over the concaved surface of the batter.

3. A clay working machine including a block, a mold removably mounted on said block, an arm pivoted adjacent to said block, a batter carried by said arm and having a concaved lower surface conforming to the contour of said mold, a flexible diaphragm located over the concaved surface of the batter, and a resilient cushion between the batter and the arm.

4. A clay working machine including a block, a mold removably mounted on said block, an arm pivoted adjacent to said block, a batter carried by said arm and having a concaved lower surface conforming to the contour of said mold, and a flexible diaphragm located over the concaved surface of the batter.

5. A clay working machine including a block, a mold removably mounted on said block, a resilient cushion between the mold and the block, an arm pivoted adjacent to said block, a batter carried by said arm and having a concaved lower surface conforming to the contour of said mold, and a flexible diaphragm located over the concaved surface of the batter.

6. A clay working machine including a block, a mold removably mounted on said block, a resilient cushion between the mold and the block, an arm pivoted adjacent to said block, a batter carried by said arm and having a concaved lower surface conforming to the contour of said mold, a resilient cushion between the batter and the arm, and a flexible diaphragm located over the concaved surface of the batter.

7. A clay working machine including a block, a mold removably mounted on said block, a resilient cushion between the mold and the block, an arm pivoted adjacent to said block, a batter carried by said arm and having a concaved lower surface conforming to the contour of said mold, a resilient cushion between the batter and the arm, and a flannel diaphragm located over the concaved surface of the batter.

8. A clay working machine including a block, a mold removably mounted on said block, a batter vertically movable relative to the mold and having a concavity in its lower surface conforming to the contour of the mold, a flexible diaphragm stretched across the concavity in the batter and connected at its edges to the batter forming an air pocket in the concavity behind the diaphragm and means for moving the batter into contact with the mold so as to flex the diaphragm and compress the air pocket.

JAMES TURNER.